(12) United States Patent
Karstens et al.

(10) Patent No.: US 9,277,351 B2
(45) Date of Patent: Mar. 1, 2016

(54) WIRELESS TRANSMISSION DURATION AND LOCATION-BASED SERVICES

(75) Inventors: Christopher Kent Karstens, Apex, NC (US); Michael Lee Massimi, S. Hamilton, MA (US)

(73) Assignee: International Business Machines Corporation, Armonk, NY (US)

( * ) Notice: Subject to any disclaimer, the term of this patent is extended or adjusted under 35 U.S.C. 154(b) by 2671 days.

(21) Appl. No.: 11/851,685

(22) Filed: Sep. 7, 2007

(65) Prior Publication Data

US 2009/0069033 A1   Mar. 12, 2009

(51) Int. Cl.
*H04W 4/02*   (2009.01)

(52) U.S. Cl.
CPC ...................... *H04W 4/02* (2013.01)

(58) Field of Classification Search
CPC ........................... H04W 4/02–4/046
USPC .............. 455/404.1, 404.2, 414.3, 456.1–457
See application file for complete search history.

(56) References Cited

U.S. PATENT DOCUMENTS

| | | | | |
|---|---|---|---|---|
| 5,390,339 A * | 2/1995 | Bruckert | ................... | G01S 5/02 342/457 |
| 6,931,254 B1 * | 8/2005 | Egner | ................ | G06Q 30/0269 455/456.1 |
| 6,970,871 B1 * | 11/2005 | Rayburn | ................ | G06Q 30/02 |
| 7,221,909 B2 * | 5/2007 | Kiyose | ................... | G01C 21/16 340/988 |
| 7,363,044 B2 * | 4/2008 | Korneluk | .............. | G01S 19/252 455/456.1 |
| 7,460,870 B2 * | 12/2008 | Moeglein | .............. | G01S 5/0257 455/456.1 |
| 7,697,933 B2 * | 4/2010 | Fukui | ..................... | H04W 4/02 370/310 |
| 2001/0022558 A1 * | 9/2001 | Karr, Jr. | .................. | G01S 1/026 342/450 |
| 2002/0155844 A1 * | 10/2002 | Rankin | ................... | H04W 4/02 455/456.1 |
| 2003/0220835 A1 * | 11/2003 | Barnes, Jr. | ......... | G06Q 10/1053 705/14.36 |
| 2003/0228846 A1 * | 12/2003 | Berliner | .................. | G01S 11/06 455/67.11 |
| 2004/0203847 A1 * | 10/2004 | Knauerhase | ........... | G06Q 10/06 455/456.1 |
| 2005/0026563 A1 * | 2/2005 | Leeper | .................... | G01S 5/021 455/41.1 |
| 2005/0075119 A1 * | 4/2005 | Sheha | .................... | G01C 21/26 455/456.6 |

(Continued)

OTHER PUBLICATIONS

U.S. Appl. No. 11/612,820, filed Jun. 21, 2007, Karstens et al.

*Primary Examiner* — Mehmood B Khan
(74) *Attorney, Agent, or Firm* — Winstead, P.C.

(57) ABSTRACT

The exemplary embodiments provide a computer implemented method, apparatus, and computer usable program code for managing location-based services provided via a wireless access point. A signal is received from a client device by at least one wireless access point. A distance the signal has traveled to the at least one wireless access point is determined. A determination as to whether the client device is within an allowed range of the at least one wireless access point is made based on the determined distance. Responsive to a determination that the client device is within an allowed range, a location of the client device is determined. Location-based service information is sent to the client device based on the determined location of the client device.

20 Claims, 8 Drawing Sheets

(56) References Cited

U.S. PATENT DOCUMENTS

| Publication No. | Date | Inventor | Classification | Sub-class |
|---|---|---|---|---|
| 2005/0261004 A1* | 11/2005 | Dietrich | G01S 5/02 | 455/456.2 |
| 2006/0022815 A1* | 2/2006 | Fischer | G06K 7/0008 | 340/505 |
| 2006/0265294 A1* | 11/2006 | de Sylva | G06Q 30/0603 | 705/28 |
| 2007/0005363 A1* | 1/2007 | Cucerzan | H04W 4/02 | 704/256 |
| 2007/0112511 A1* | 5/2007 | Burfeind | G06F 17/30241 | 701/469 |
| 2007/0149214 A1* | 6/2007 | Walsh | H04L 12/1859 | 455/456.1 |
| 2008/0039016 A1* | 2/2008 | Bonta | H04B 7/2606 | 455/41.2 |
| 2008/0045234 A1* | 2/2008 | Reed | H04W 8/02 | 455/456.1 |
| 2008/0248815 A1* | 10/2008 | Busch | H04W 4/02 | 455/456.5 |
| 2008/0298250 A1* | 12/2008 | Larsson | H04L 45/123 | 370/238 |
| 2009/0137256 A1* | 5/2009 | Karaoguz | G01S 13/878 | 455/456.6 |
| 2009/0201152 A1* | 8/2009 | Karr | G01S 5/14 | 340/545.6 |
| 2011/0053648 A1* | 3/2011 | Gustaf | H01Q 1/2258 | 455/562.1 |
| 2011/0161276 A1* | 6/2011 | Krumm | G06F 17/3087 | 706/50 |
| 2011/0194444 A1* | 8/2011 | Karstens | H04L 63/10 | 370/252 |

* cited by examiner

WIRELESS TRANSMISSION DURATION AND LOCATION-BASED SERVICES

BACKGROUND OF THE INVENTION

1. Field of the Invention

The present invention is related generally to a data processing system and in particular to a method and apparatus for a wireless access point. More particularly, the present invention is directed to a computer-implemented method, apparatus, and computer-usable program code for managing location-based services provided via a wireless access point.

2. Description of the Related Art

Wireless networking technology enables users to access networks, such as the Internet, from wireless hand held computing devices. Wireless hand held computing devices include, but are not limited to, laptop computers, tablet PCs, personal digital assistants (PDAs), and cellular telephones.

A wireless access point (WAP) is a device that provides access to a wireless network such as a router. A client device, such as a laptop or a PDA, that wants to access a wireless network, requests access from the wireless access point. The wireless access range is the range within which a wireless access point can provide a client with access to a wireless network.

A wireless access point can provide open access to client devices. Open access provides access to all requesting client devices within the access range of the wireless access point without requiring a user authentication. Frequently, wireless access point owners want to provide open access to persons on their property. For example, coffee shops, hotels, airports, restaurants, and colleges generally have open access points to draw in customers and students.

A wireless transmission travels at one foot per nanosecond. If the wireless transmission duration between two devices is twenty nanoseconds, the devices are determined to be twenty feet apart. Commonly assigned, co-pending U.S. patent application Ser. No. 11/612,820 provides a mechanism for measuring wireless transmission duration to support security policies.

While great strides have been made in the area of wireless access points, problems still exist, particularly in the application of wireless access points to location-based services (LBS).

BRIEF SUMMARY OF THE INVENTION

The exemplary embodiments provide a computer implemented method, apparatus, and computer usable program code for managing location-based services provided via a wireless access point. A signal is received from a client device by at least one wireless access point. A distance the signal has traveled to the at least one wireless access point is determined. A determination as to whether the client device is within an allowed range of the at least one wireless access point is made based on the determined distance. Responsive to a determination that the client device is within an allowed range, a location of the client device is determined. Location-based service information is sent to the client device based on the determined location of the client device.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
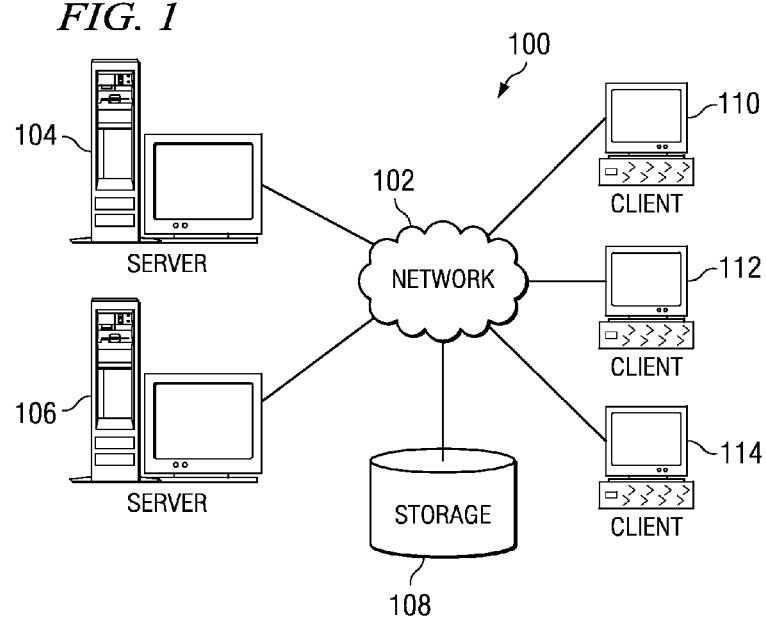
FIG. 1 is a pictorial representation of a network of data processing systems in which illustrative embodiments may be implemented.
Figure 2:
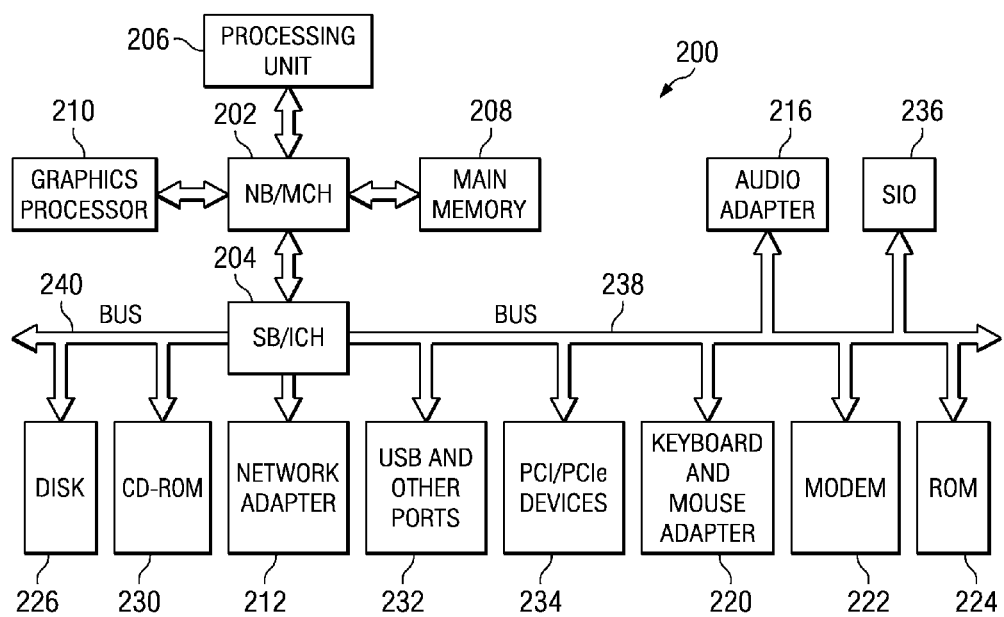
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments.

In the depicted example, data processing system 200 employs a hub architecture including interface and memory controller hub (interface/MCH) 202 and interface and input/output (I/O) controller hub (interface/ICH) 204. Processing unit 206, main memory 208, and graphics processor 210 are coupled to interface and memory controller hub 202. Processing unit 206 may contain one or more processors and even may be implemented using one or more heterogeneous processor systems. Graphics processor 210 may be coupled to the interface/MCH through an accelerated graphics port (AGP), for example.

In the depicted example, local area network (LAN) adapter 212 is coupled to interface and I/O controller hub 204 and audio adapter 216, keyboard and mouse adapter 220, modem 222, read only memory (ROM) 224, universal serial bus (USB) and other ports 232, and PCI/PCIe devices 234 are coupled to interface and I/O controller hub 204 through bus 238, and hard disk drive (HDD) 226 and CD-ROM 230 are coupled to interface and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to interface and I/O controller hub 204.

An operating system runs on processing unit 206 and coordinates and provides control of various components within data processing system 200 in FIG. 2. The operating system may be a commercially available operating system such as Microsoft® Windows Vista™ (Microsoft and Windows Vista are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer-implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in interface and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
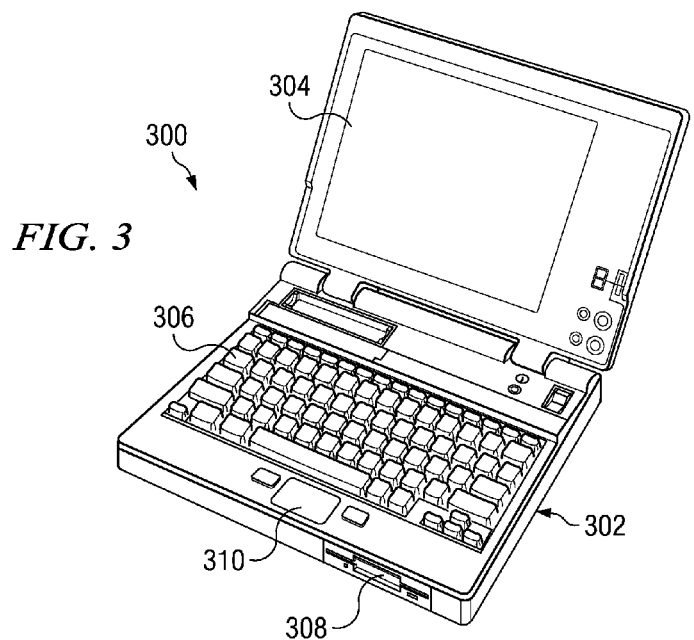
FIG. 3 is a pictorial representation of a mobile computing device in which the present invention may be implemented is depicted in accordance with a preferred embodiment of the present invention.

With reference now to FIG. 3, a pictorial representation of a mobile computing device in which the present invention may be implemented is depicted in accordance with a preferred embodiment of the present invention. A mobile computing device is a computing device that is compact enough to be held in one or two human hands. For example, a mobile computing device includes cellular phones, tablet computers, smart watches, personal navigation devices, and personal digital assistants, also known as PDAs and palmtops.

Mobile computer 300 is depicted which includes system unit 302, video display terminal 304, keyboard 306, storage devices 308, which may include floppy drives and other types of permanent and removable storage media, and pointer device 310. Additional input devices may be included with mobile computer 300, such as, for example, a mouse, joystick, touch screen, trackball, microphone, and the like. Mobile computer 300 may be implemented using any suitable computer, such as an IBM Thinkpad computer, which is a product of International Business Machines Corporation, located in Armonk, N.Y. Mobile computer 300 also preferably includes a graphical user interface (GUI) that may be implemented by means of systems software residing in computer readable media in operation within mobile computer 300.

In accordance with the aspects of the present invention, mobile computer 300 can include a laptop computer, a tablet computer, a cellular telephone, a personal digital assistant (also known as PDAs or palmtops), a personal navigator, and any other known or available mobile computing device.

Figure 4:
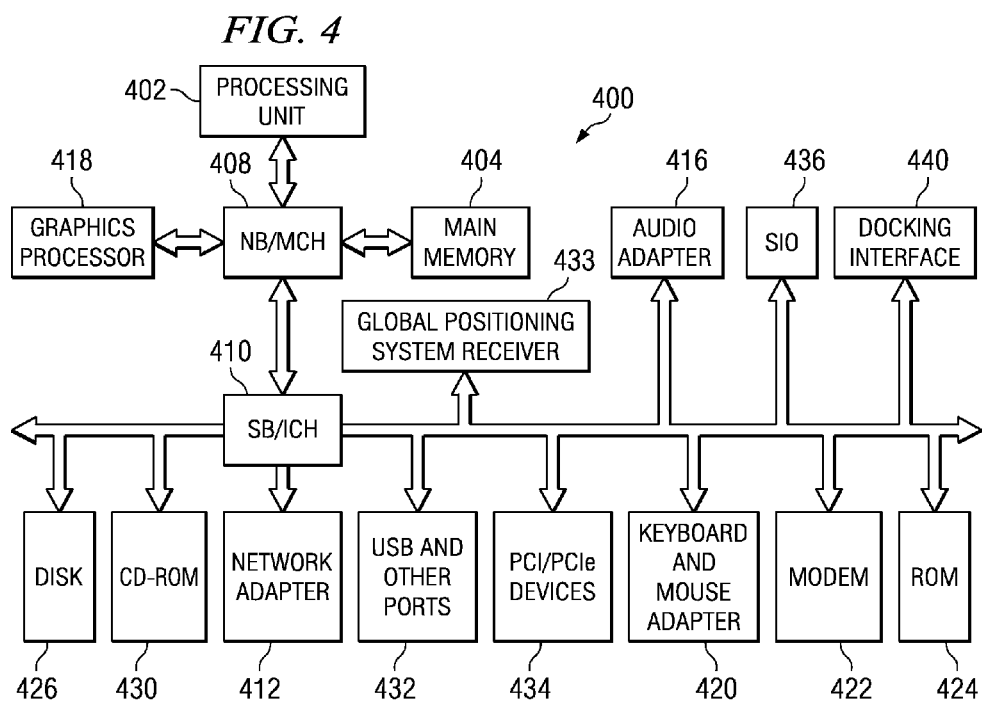
FIG. 4 is a block diagram of a laptop data processing system is shown in which the present invention may be implemented.

Turning now to FIG. 4, a block diagram of a laptop data processing system is shown in which the present invention may be implemented. Data processing system 400 is an example of a mobile computing device, such as mobile computer 300 in FIG. 3, in which code or instructions implementing the processes of the present invention may be located. In the depicted example, data processing system 400 employs a hub architecture including an interface and memory controller hub (interface/MCH) 408 and an interface and input/output (I/O) controller hub (interface/ICH) 410. Processor 402, main memory 404, and graphics processor 418 are connected to interface and memory controller hub 408. Graphics processor 418 may be connected to the MCH through an accelerated graphics port (AGP), for example.

In the depicted example, network adapter 412, audio adapter 416, keyboard and mouse adapter 420, modem 422, read only memory (ROM) 424, hard disk drive (HDD) 426, CD-ROM drive 430, universal serial bus (USB) ports and other communications ports 432, a global positioning system (GPS) receiver 433, and PCI/PCIe devices 434 may be connected to interface and I/O controller hub 410.

PCI/PCIe devices may include, for example, Ethernet adapters, add-in cards, PC cards for notebook computers, etc. PCI may use a cardbus controller, while PCIe does not. ROM 424 may be, for example, a flash binary input/output system (BIOS). Hard disk drive 426 and CD-ROM drive 430 may use, for example, an integrated drive electronics (IDE) or serial advanced technology attachment (SATA) interface. A super I/O (SIO) device 436 may be connected to interface and I/O controller hub 410.

Global positioning system receiver 433 receives data from various satellites. Global positioning system receiver 433 determines the latitude and longitude of global positioning system receiver 433 based upon the difference in time of reception for signals received from different global positioning system satellites.

Data processing system 400 may be a mobile computing device, such as a laptop computer or hand held computer, such as a personal digital assistant, cellular telephone, or tablet computer. Docking interface 440 may also be connected to the interface and I/O controller hub 410. Docking interface 440 provides port replication to allow the data processing system to easily connect to a keyboard, pointing device, monitor, printer, speakers, etc. The docking interface allows the mobile computing device to operate as a desktop computer with the more immobile peripheral devices.

An operating system runs on processor 402 and is used to coordinate and provide control of various components within data processing system 400. The operating system may be a commercially available operating system such as Windows XP, which is available from Microsoft Corporation. An object oriented programming system such as Java® may run in conjunction with the operating system and provides calls to the operating system from Java® programs or applications executing on data processing system 400. "Java" is a trademark of Sun Microsystems, Inc. Instructions for the operating system, the object-oriented programming system, and applications or programs are located on storage devices, such as hard disk drive 426, and may be loaded into main memory 404 for execution by processor 402. The processes of the present invention are performed by processor 402 using computer-implemented instructions, which may be located in a memory such as, for example, main memory 404, ROM 424, or in one or more peripheral devices 426 and 430.

Network adapter 412 is a network adapter for accessing a wireless network. In one embodiment, network adapter 412 utilizes wireless application protocol to enable data processing system 400 to access wireless networks. A wireless access point links a wireless network with a computer network, such as network 102 in FIG. 1. The wireless access point enables a user at a mobile computing device to access data on the computer network through the wireless network.

Those of ordinary skill in the art will appreciate that the hardware in FIG. 4 may vary depending upon the implementation. Other internal hardware or peripheral devices, such as flash memory, equivalent nonvolatile memory, or optical disk drives and the like, may be used in addition to or in place of the hardware depicted in FIG. 4. Also, the processes of the present invention may be applied to a multiprocessor data processing system.

For example, data processing system 400 may be a PDA, which is configured with flash memory to provide non-volatile memory for storing operating system files and/or user-generated data. The depicted example in FIG. 4 and above-described examples are not meant to imply architectural limitations. For example, data processing system 400 also may be a tablet computer, personal navigation device, or telephone device in addition to taking the form of a PDA.

Figure 5:
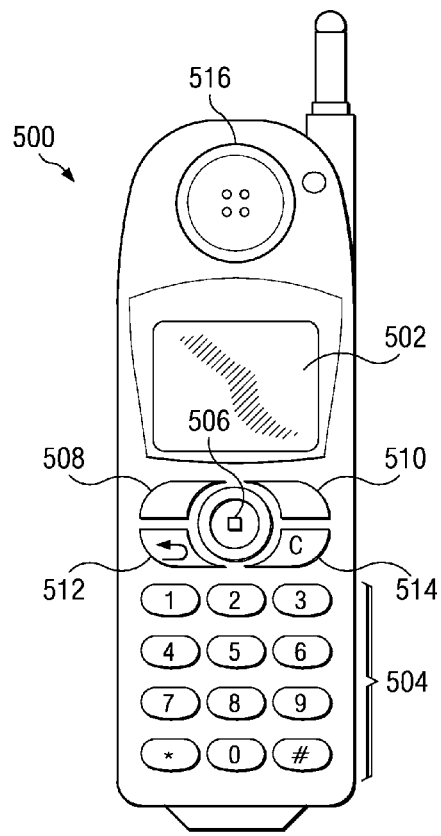
FIG. 5 depicts a mobile telephone in which the present invention may be implemented.

FIG. 5 is a mobile telephone in which the present invention may be implemented. Mobile phone 500 includes screen 502, which is capable of displaying pictures and text. Additionally, mobile phone 500 also includes numeric keypad 504, joystick 506, and buttons 508, 510, 512, and 514 placed around the joystick 506. These buttons are used to initiate various functions in mobile phone 500. These functions include, for example, activating a menu, displaying a calendar or task list, or initiating a call. Mobile phone 500 can also include camera 516, which may be used to take pictures or videos depending upon the implementation.

In addition, mobile phone 500 includes a global positioning system receiver for determining a position of mobile phone 500 on the Earth's surface by comparing data received from various satellites by the global positioning system receiver.

Figure 6:
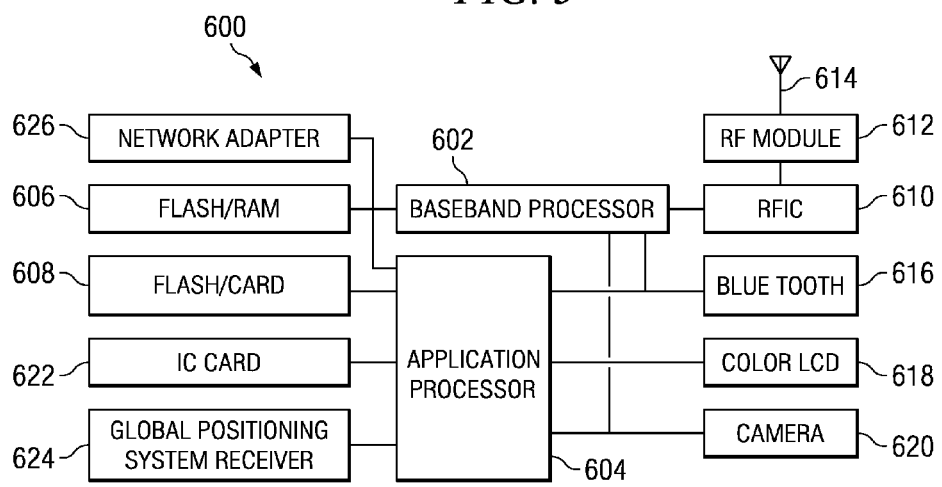
FIG. 6 is a block diagram of a camera phone is depicted in accordance with a preferred embodiment of the present invention.

With reference now to FIG. 6, a block diagram of a camera phone is depicted in accordance with a preferred embodiment of the present invention. Camera phone 600 includes baseband processor 602, application processor 604, flash/static random access memory (SRAM) 606, flash card 608, radio frequency integrated circuit (RFIC) 610, radio frequency (RF) module 612, antenna 614, Blue Tooth unit 616, color liquid crystal display (LCD) 618, camera 620, IC card 622, global positioning system receiver 624, and network adapter 626.

Baseband processor 602 provides for receiver and transmitter operations and is also referred to as a transceiver. In particular, baseband processor 602 handles all audio, signal, and data processing needed to receive and send data using RF transmissions or Blue Tooth transmissions. Application processor 604 provides the processing power for other functions within camera phone 600. For example, calculators, calendars, alarms, camera functions, and directories are provided through application processor 604. Flash/SRAM 606 is a storage device in which various instructions for providing the functions within camera phone 600 are located and provide upgrades. Flash card 608 is a storage device in which user data and applications may be stored. An example of flash card 608 is a secure digital card.

A pathway for the transmission of voice and other types of data is through RFIC 610. Additionally, short-range transmissions may be sent or received through Blue Tooth unit 616.

Blue Tooth unit 616 conforms to Blue Tooth wireless specification, which defines the link layer and the application layer for product developers. Both of these transmissions are made through antenna 614 in this illustrative example.

Color LCD 618 provides a display for pictures and other data for camera phone 600. Camera 620, in this example, is a complementary metal oxide semiconductor (CMOS) camera that may be built into camera phone 600 or connected to camera phone 600 as a module, such as IC card 622. IC card 622 also may contain other application specific functions, such as a modem or additional memory.

Global positioning system receiver 624 receives data from various satellites. Global positioning system receiver 624 determines the latitude and longitude of global positioning system receiver 624 by calculating the time taken for each satellite signal to reach global positioning system receiver 624. Based on the difference in time of reception for signals received from different satellites, global positioning system receiver 624 is able to determine the position of global positioning system receiver 624.

Network adapter 626 is a network adapter for accessing a wireless network. In one embodiment, network adapter 626 utilizes wireless application protocols to enable camera phone 600 to access wireless networks.

Figure 7:
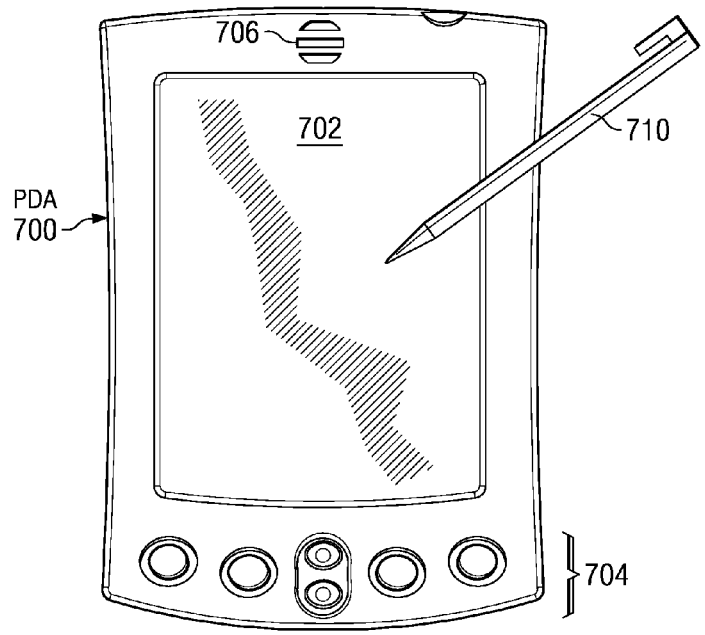
FIG. 7 is a diagram of a client in the form of a personal digital assistant in accordance with a preferred embodiment of the present invention.

Turning now to FIG. 7, a diagram of a client in the form of a personal digital assistant (PDA) is depicted in accordance with a preferred embodiment of the present invention. PDA 700 includes a display 702 for presenting textual and graphical information. Display 702 may be a known display device, such as a liquid crystal display (LCD) device. The display may be used to present a map or directions, calendar information, a telephone directory, or an electronic mail message. In these examples, display 702 may receive user input using an input device such as, for example, stylus 710.

PDA 700 may also include keypad 704 and speaker 706. PDA 700 may also include an antenna that is internal to PDA 700. Keypad 704 may be used to receive user input in addition to using display 702. Speaker 706 provides a mechanism for audio output, such as presentation of an audio file. The internal antenna provides a mechanism used in establishing a wireless communications link between PDA 700 and a network and/or global positioning system satellites. PDA 700 also preferably includes a graphical user interface that may be implemented by means of systems software residing in computer readable media in operation within PDA 700.

Figure 8:
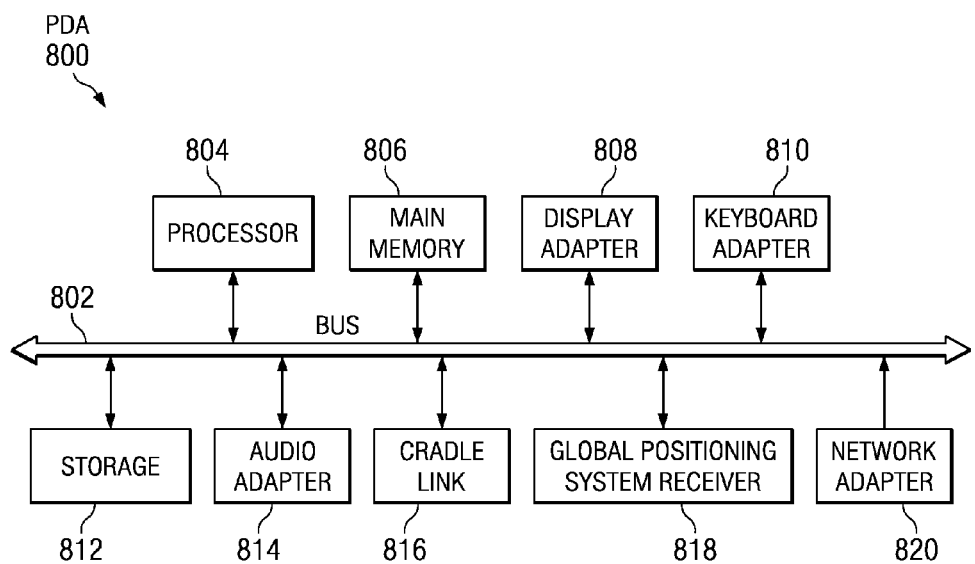
FIG. 8 is a block diagram of a personal digital assistant in accordance with a preferred embodiment of the present invention.

With reference now to FIG. 8, a block diagram of a PDA is shown in accordance with a preferred embodiment of the present invention. PDA 800 is an example of a PDA, such as PDA 700 in FIG. 7, in which code or instructions implementing the processes of the present invention may be located. PDA 800 includes a bus 802 to which processor 804 and main memory 806 are connected. Display adapter 808, keyboard adapter 810, storage 812, audio adapter 814, and global positioning system receiver 818 also are connected to bus 802. Cradle link 816 provides a mechanism to connect PDA 800 to a cradle used in synchronizing data in PDA 800 with another data processing system. Further, display adapter 808 also includes a mechanism to receive user input from a stylus when a touch screen display is employed.

Global positioning system receiver 818 receives signals from various satellites. Global positioning system receiver 818 determines the latitude and longitude of global positioning system receiver 818 based upon the difference in time of reception of the signals from the different satellites.

An operating system runs on processor 804 and is used to coordinate and provide control of various components within PDA 800. The operating system may be, for example, a commercially available operating system such as Windows CE, which is available from Microsoft Corporation. Instructions for the operating system and applications or programs are located on storage devices, such as storage 812, and may be loaded into main memory 806 for execution by processor 804.

Network adapter 820 is a network adapter for accessing a wireless network. In one embodiment, network adapter 820 utilizes wireless application protocol to enable PDA 800 to access wireless networks. Wireless access point links a wireless network with a computer network, such as network 102 in FIG. 1. The wireless access point enables a user at a mobile computing device to access data on the computer network through the wireless network.

Those of ordinary skill in the art will appreciate that the hardware in FIG. 8 may vary depending upon the implementation. Other internal hardware or peripheral devices, such as flash ROM (or equivalent nonvolatile memory) or optical disk drives and the like, may be used in addition to or in place of the hardware depicted in FIG. 8.

Figure 9:
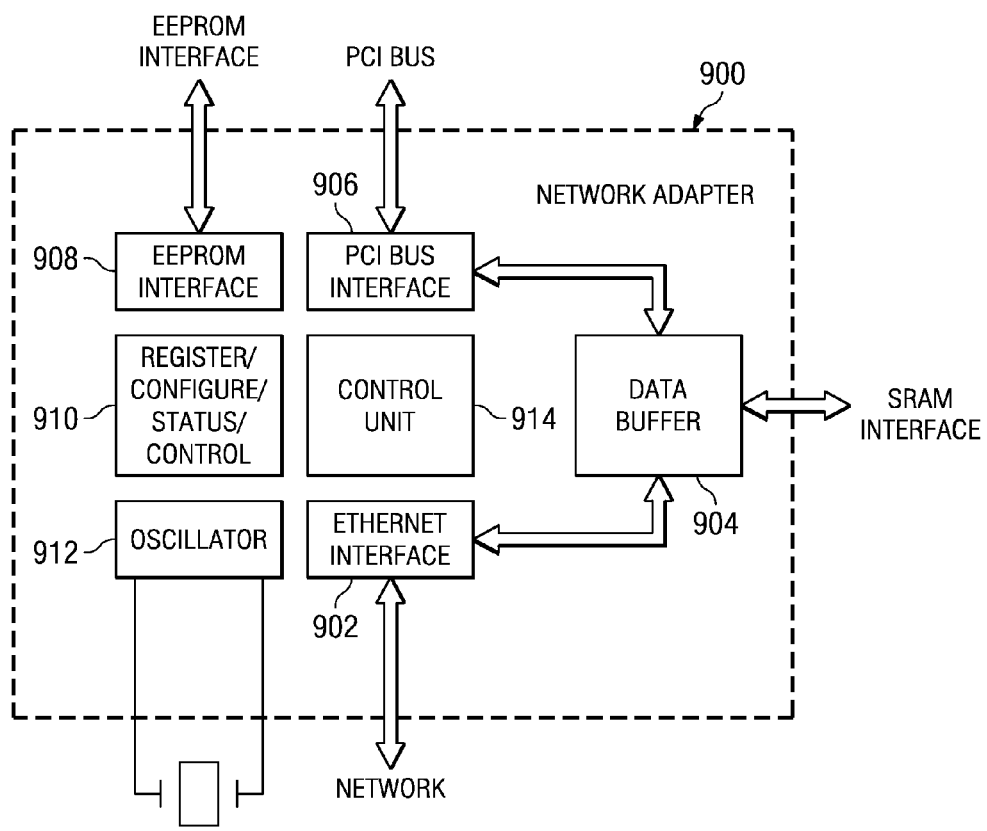
FIG. 9 is a block diagram of a network adapter in which illustrative embodiments may be implemented.

FIG. 9 is a block diagram of a network adapter in which illustrative embodiments may be implemented. Network adapter 900 may be implemented as network adapter 212 in FIG. 2, network adapter 412 in FIG. 4, network adapter 626 in FIG. 6, or network adapter 820 in FIG. 8.

As shown, network adapter 900 includes Ethernet interface 902, data buffer 904, and PCI bus interface 906. These three components provide a path between the network and the bus of the data processing system. Ethernet interface 902 provides an interface to the network connected to the data processing system. PCI bus interface 906 provides an interface to a bus, such as bus 238 in FIG. 2. Data buffer 904 is used to store data being transmitted and received through network adapter 900. This data buffer also includes a connection to a SRAM interface to provide for additional storage.

Network adapter 900 also includes electrically erasable programmable read-only memory (EEPROM) interface 908, register/configure/status/control unit 910, oscillator 912, and control unit 914. EEPROM interface 908 provides an interface to an EEPROM chip, which may contain instructions and other configuration information for network adapter 900. Different parameters and setting may be stored on an EEPROM chip through EEPROM interface 908. Register/configure/status/control unit 910 provides a place to store information used to configure and run processes on network adapter 900. For example, a timer value for a timer may be stored within these registers. Additionally, status information for different processes also may be stored within this unit. Oscillator 912 provides a clock signal for executing processes on network adapter 900.

Control unit 914 controls the different processes and functions performed by network adapter 900. Control unit 914 may take various forms. For example, control unit 914 may be a processor or an application-specific integrated chip (ASIC). In these examples, the processes of the present invention used to manage flow control of data are executed by control unit 914. If implemented as a processor, the instructions for these processes may be stored in a chip accessed through EEPROM interface 908.

Data is received in receive operations through Ethernet interface 902. This data is stored in data buffer 904 for transfer onto the data processing system across PCI bus interface 906. For example, the data may be transferred onto a bus, such as bus 240 in FIG. 2.

Frequently, wireless access point owners want to provide location-based services to persons on their property. For example, a coffee shop owner may want to provide location-based services to customers inside the shop, but not to customers outside or in adjacent shops. However, wireless access points cannot readily know the precise location of a customer within the range of a given wireless access point or know the proximity of a customer to a particular product within the range of a given wireless access point. Therefore, current wireless access points frequently provide location-based services to people located away from the product or services being advertised or offered by the wireless access point owner.

The illustrative embodiments recognize that an owner of a wireless access point may desire to provide location-based services to some selected areas of the owner's property and not to other areas of the owner's property and/or adjacent properties using current wireless access points and Internet service providers.

The illustrative embodiments also recognize that current wireless access points and Internet service providers do not provide a means for readily limiting or adjusting location-based services to a specific location of a customer. Therefore, the illustrative embodiments provide a computer implemented method, apparatus, and computer-usable program code for managing location-based services provided by a wireless access point.

Exemplary embodiments utilize nanosecond precision time stamping to provide geographically dispersed location-based services from a single source. Exemplary embodiments provide a compact, integrated solution for providing location-based services that provide several advantages over current solutions in terms of ease of deployment, maintenance, cost, and return on investment. Prior location-based service solutions require the use of several components that require complex integration and installation.

In one embodiment, a distance between a client device and the wireless access point is determined and compared to a determined distance between the client device and a second wireless access point. As the distance between the two wireless access points is known, these three distances are used to determine a precise location of the client device. Based on the determined location, location-based services are broadcast to the client device. Knowing the precise location of a client allows for a lookup to be performed in order to determine what products the client device is near and provide the client device with location-based services oriented to the nearby products.

Additionally, as the exact dimensions of the store or business are known, determining the precise location of the client device also determines if the client device is within the premises of the store. Thus, if it is determined that the client device is not within the premises of the store, location-based services are not provided to the client device. However, in alternate embodiment, client devices within a specified distance of the exterior of the premises are provided with location-based services.

In an alternate embodiment, multiple measurements of the distance between the client device and the two wireless access points are taken. Based on these measurements, a speed and direction of travel can be determined for a client device. Location-based services are then provided to the client device based on the rate of travel of the client device. Location-based services are broadcast to the client device such that the location-based services are received by the client device before the device has moved physically passed the item, and allowing time for the customer to react to the location-based service.

Figure 10:
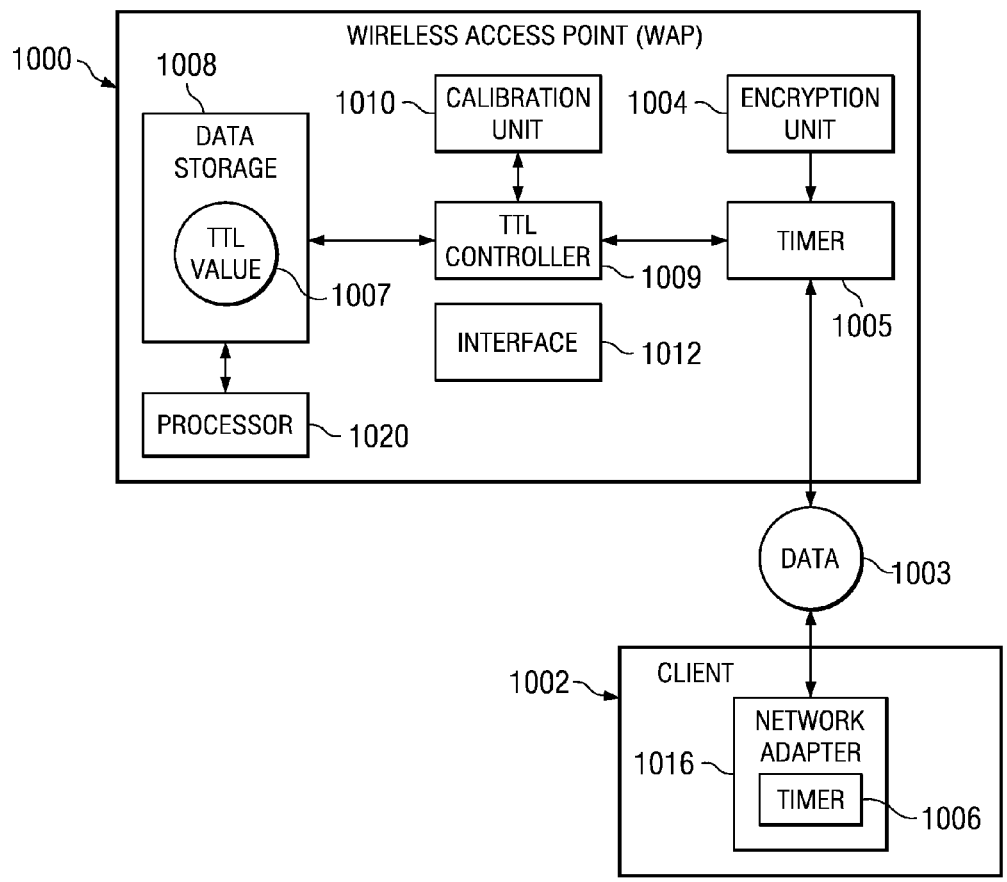
FIG. 10 is a block diagram illustrating a data flow between a wireless access point and a client-computing device for managing location-based services provided via a wireless access point in accordance with an illustrative embodiment.

FIG. 10 is a block diagram illustrating a data flow between a wireless access point and a client-computing device for managing location-based services provided via a wireless access point in accordance with an illustrative embodiment. Wireless access point (WAP) 1000 is a device that acts as a communications hub for client-computing devices connecting to a network, such as a LAN or the Internet. For example, wireless access point 1000 can be a network router.

Client 1002 is any known or available client-computing device, including but not limited to, a desktop computer, a laptop computer, a personal digital assistant (PDA), a notebook computer, a cell phone, a smart watch, and/or any other device to enable a user to access a network. Client 1002 may be implemented using any type of computing device, such as a personal computer, laptop, PDA, or any other computing device depicted in FIGS. 1-8. In this example, client 1002 is a mobile computing device, such as mobile computer 300 in FIG. 3, mobile phone 500 in FIG. 5, or PDA 700 in FIG. 7.

Client 1002 sends a data packet, such as data 1003, to wireless access point 1000 to request access to a wireless network. Data 1003 can include a request for access to a wireless network, a grant of access to a wireless network, an acknowledge, a synchronization signal, a sync-acknowledge signal, or any other digital data, global positioning system satellite signal, or radio wave transmission sent or received by wireless access point 1000 and/or client 1002.

Encryption unit 1004 is a hardware and/or software component for encrypting data 1003 transmitted from wireless access point 1000 to client 1002 and decrypting data 1003 received by wireless access point 1000 from client 1002. In this example, encryption unit 1004 encrypts timing data used to measure a distance between wireless access point 1000 and client 1002.

Timing data is data that includes a precise nanosecond-level clock time and/or an amount of time between a send clock time and a retrieve clock time. Timing data is used to determine the distance between wireless access point 1000 and client 1002.

If a hacker is able to obtain access to unencrypted timing data, the hacker may be able to obtain unauthorized access to the network by falsifying a response to wireless access point 1000. Thus, timing data is encrypted so that a hacker will not be able to see timing information in the clear. Thus, encryption unit 1004 encrypts timing data transmitted to client 1002 to prevent an unauthorized or malicious user from obtaining access to timing data. Encryption unit 1004 encrypts timing data using any known or available method for encrypting data and/or encrypting radio wave signals. Although not shown, client 1002 also includes an encryption unit for encrypting and de-encrypting data, such as timing data.

In one embodiment, encryption unit 1004 encodes or scrambles timing information used to determine the distance between wireless access point 1000 and client 1002 by transmitting timing information through multiple different radio frequencies. For example, timing information can be encrypted using digital spread spectrum and/or digital transmission. Digital spread spectrum is a method in which a signal generated at a single radio frequency is deliberately spread over a wide band of frequencies to prevent detection or jamming.

An example of digital spread spectrum is frequency hopping. In frequency hopping, a signal is sent over a carrier wave that is rapidly switched among many frequency channels in a sequence known to both the sender of the signal and the receiver of the signal.

Timer 1005 is a hardware and/or software device for maintaining a current time. In other words, timer 1005 performs a clock function. Timers 1005 and 1006 are used to measure a distance between wireless access point 1000 and client 1002.

Timer 1005 on wireless access point 1000 is synchronized with timer 1006 on client 1002 to ensure accurate time recording when a data packet is sent from wireless access point 1000 to client 1002 and when a data packet is received by wireless access point 1000 from client 1002.

In this example, timers 1005 and 1006 are high-resolution timers for measuring radio wave distance between wireless access point 1000 and client 1002. Radio waves are electromagnetic energy. Radio waves travel at the speed of light, which is approximately 186,000 miles per second in a vacuum. Timer 1005 can determine how far a radio signal from client 1002 has traveled by timing an amount of time required for a signal sent by client 1002 to arrive at wireless access point 1000. Likewise, timer 1006 can determine a distance between client 1002 and wireless access point 1000 by measuring an amount of time required for a signal sent by wireless access point 1000 to arrive at client 1002. This timing calculation is accomplished in these illustrative examples by time stamping a radio wave transmission or data packet when the radio wave transmission or data packet is sent and time stamping a data packet with a precise clock time when the data packet was received. The timing calculation may also be performed by time stamping an Internet protocol (IP) data package rather than time stamping a radio wave transmission. In addition, time stamping may be performed by a hardware component, a software component, or by any combination of hardware and software components.

Thus, for example, when client 1002 sends data 1003 to wireless access point 1000, timer 1006 adds an exact time that data 1003 was transmitted to the data packet. In other words, timer 1006 includes an exact time in the data packet indicating when the data packet was sent from client 1002. When wireless access point 1000 receives data 1003, timer 1005 records the exact clock time that data 1003 was received. Timer 1005 can determine a distance between client 1002 and wireless access point 1000 based on the speed of a radio wave transmission and the amount of time it took data 1003 to arrive at wireless access point 1000. In order to make an accurate determination of the distance between wireless access point 1000 and client 1002, timers 1005 and 1006 are synchronized down to the nanosecond in these examples.

In one embodiment, timer 1005 includes a master clock that periodically broadcasts a sync message based on the local clock of the master clock to enable timer 1005 to make a precise measurement of exactly when the sync message was sent. Timer 1005 sends a follow up sync package that contains the exact local clock time of timer 1005 when the sync package was sent. Timer 1006 uses the time in the follow up sync package to determine when the sync message was sent. Timer 1006 makes a precise measurement of exactly when the sync message was received and the time when the sync package was sent by timer 1005 to determine a distance between wireless access point 1000 and client 1002. In one example, timer 1005 sends a sync message and a follow up sync package at regular intervals. For example, timer 1005 may send a sync message every one second, every two seconds, every four seconds, every eight seconds, or at any time interval.

Time-to-live (TTL) value 1007 is a limitation on the amount of time or number of iterations that may occur before a data packet is discarded. Each data packet sent by client 1002 to wireless access point 1000 may have an associated TTL value 1007. This enables client 1002 to control its intended communication range. In other words, client 1002 can control its communication range based on the whether a data package is received within the associated time-to-live. The exchange of data packages between client 1002 and wireless access point 1000 to control the communication range may be referred to as range checking data exchange.

Likewise, during range checking data exchange, each data packet sent by wireless access point 1000 to client 1002 may also have a TTL value. Thus, if client 1002 sends a request for access to the wireless network in data 1003 to wireless access point 1000, wireless access point 1000 will discard or disregard the requested data 1003 if it is received by wireless access point 1000 after the TTL has expired. Likewise, if client 1002 receives data 1003 from wireless access point 1000 after a TTL value provided by wireless access point 1000 has expired, client 1002 will discard or disregard data 1003. Thus, the range in which client 1002 can obtain location-based service via wireless access point 1000 can be controlled by providing a TTL value that corresponds to the size of the premises of the store.

However, this method is not completely effective or accurate by itself. Most premises do not contain walls that are all equal-distant from a wireless access point. Thus, a TTL value that is sufficient to allow a client device within the premises that is a maximum distance away from a wireless access point to receive location-based services, may also allow a client device that is beyond the boundaries of the premises to receive location-based services.

TTL value 1007 can be measured in any unit of time, such as seconds, milliseconds, nanoseconds, or any other unit of time. In this example, TTL value 1007 is measured in nanoseconds to allow for greater precision in timing data. TTL value 1007 is stored on data storage 1008. Data storage 1008 is a data storage device for storing data, such as storage 108 in FIG. 1. Data storage 1008 can include, but is not limited to, a hard disk, a main memory, a flash memory, a floppy disk, a compact disk (CD), a compact disk re-writable (CD-RW), a read only memory (ROM), a random access memory (RAM), a non-volatile random access memory (NVRAM), or any other known or available data storage device. Data storage 1008 may be located locally or remotely to wireless access point 1000.

In alternate embodiments data storage 1008 also stores data regarding a store layout, inventory and location-based services. Further, data storage 1008 may also store instructions for calculating a rate and direction of movement of a client device, altering the TTL setting, updating the inventory and location-based services information, depending upon the particular implementation. Processor 1020 executes instructions stored in data storage 1008 to carry out various functions of exemplary embodiments, according to the various specific implementations.

TTL controller 1009 is a software component for determining a distance between wireless access point 1000 and client 1002 based on timing data provided by timer 1005 and timer 1006 and TTL value 1007. TTL controller 1009 determines whether to send location-based services to client 1002 based on the distance of client 1002 from wireless access point 1000. In other words, TTL controller 1009 identifies the distance of client 1002 from wireless access point 1000 to form a client distance. TTL controller 1009 then makes a determination as to whether the client distance is within an allowed range. In other words, even if client 1002 is within the actual access point range of wireless access point 1000, TTL controller 1009 will only allow location-based services to be broadcast to client 1002 if client 1002 is also within a predetermined range.

Calibration unit 1010 is a software component for setting a user selected access range that is less than an actual access range. The actual access range is the actual range within which wireless access point 1000 can recognize client 1002 and provide access to a wireless network. In other words, the actual access range may be a maximum access range for wireless access point 1000. The user selected open access range is a range that is equal to or less than the actual access point range generated by wireless access point 1000. In this example, the user selected access range is an access range selected by the user that is more restrictive and limited than the actual range provided by wireless access point 1000. The user selected access range covers a smaller area then the actual access range.

Calibration unit 1010 is set to a calibration mode. A user selects the access range by walking around the perimeter of the selected access range area of the wireless access point with a mobile client computing device, such as a PDA. As the user walks around the perimeter, the user sends data packet 1003 with timing data to wireless access point 1000. In response, wireless access point 1000 sends data packet 1003 with a given TTL value 1007 to a mobile client computing device. If the mobile client computing device receives data packet 1003 within the TTL amount of time, the mobile computing device sends a response data packet to wireless access point 1000.

In response to receiving the response data packet, calibration unit 1010 identifies the given TTL value as a TTL value that is greater than or equal to a desired TTL value. If the mobile client computing device receives the data packet after the TTL amount of time has expired, the mobile client computing device does not send a response data packet. If calibration unit 1010 does not receive a response data packet, calibration unit 1010 identifies the given TTL value as a TTL value that is too low. The calibration unit will then send another data packet with a TTL value that is greater than the previous TTL value. In this manner, calibration unit 1010 continues sending and receiving data packets with progressively greater TTL values until calibration unit 1010 selects a TTL value corresponding to the user selected access range.

In other words, calibration client is located at a calibration point. The calibration client is a computing device that is used to calibrate the wireless access point. The calibration client should be taken to a calibration point to calibrate the wireless access point. The calibration client identifies one or more TTL values, such as TTL value 1007, at this calibration point.

The user may then move to a different calibration point and identify one or more additional TTL values at the new calibration point. For example, a user may use a calibration client to identify TTL values at the four corners of a store. The TTL values identified and collected at the two or more different calibration points form a set of desired TTL values. The calibration client selects the largest TTL value from the set of desired TTL values to ensure that all of the calibration points fall within the selected access range. In other words, if the set of two or more calibration points are the points at the four corners of a store, selecting the largest TTL value from the set of desired TTL values will ensure that all four corners of the store are within the selected access range.

However, in another embodiment, the smallest TTL value may be selected from the set of desired TTL values to ensure that the selected access range falls completely within the owner's property. In other words, the smallest TTL value will minimize or eliminate any overlap of the selected access range with adjacent properties. However, using the smallest TTL value may cause one or more of the calibration points to fall outside the selected access range. Thus, in accordance with the illustrative embodiment, any TTL value may be selected from the set of desired TTL values. However, selecting the largest TTL value may allow all the calibration points in the set of calibration points to fall within the selected access range.

In another embodiment, rather than walking the perimeter of the desired access range area and sending data packets 1003 to wireless access point 1000 at two or more calibration points, a user only performs a calibration from one calibration point. In this example, if a user wants an access range with a ten-foot radius, the user moves to a location ten-feet (10 ft) from wireless access point 1000. The user sends a calibration data packet 1003 including a time the data packet 1003 was sent to wireless access point 1000. Calibration unit 1010 calibrates user selected access range based on the time it takes the calibration data packet 1003 to reach wireless access point 1000 to identify the user selected access range. The time it takes the calibration data packet 1003 to reach wireless access point 1000 is the difference between a transmit time when the data packet 1003 was sent by client 1002 and a receive time when the data packet 1003 was received by wireless access point 1000. The amount of time for the calibration data packet 1003 to reach wireless access point 1000 is saved in data storage 1008 as TTL value 1007.

In one embodiment, rather than using calibration unit 1010 to identify TTL value 1007, a user can enter a TTL value or a user selected access range directly into wireless access point 1000 through interface 1012 to form TTL value 1007. Interface 1012 may be any type of known or available user interface for providing input to wireless access point 1000 or receiving output from wireless access point 1000, including but not limited to, a graphical user interface (GUI), a menu-driven interface, and/or a command line interface.

Network adapter 1016 is a device for allowing client 1002 to obtain access to a network, such as network adapter 900 in FIG. 9.

Thus, in this example, network adapter 1016 of client 1002 sends data 1003 to wireless access point 1000 to request access to a wireless network. Timer 1006 of client 1002 includes a precise time that data 1003 is transmitted to wireless access point 1000 to form a transmit time. Timer 1005 of wireless access point 1000 identifies a precise time that data 1003 is received by wireless access point 1000 to form a receive time. TTL controller 1009 identifies a distance from client 1002 to wireless access point 1000 based on the transmit time and receive time. Thus, distance is determined based on transmit times and receive times for data packages exchanged during a range checking data exchange.

Then, TTL controller 1009 makes a determination as to whether the identified distance to client 1002 is within an allowable access range by comparing the difference between the send time and the receive time with TTL value 1007. If the difference between the send time and the receive time is greater than TTL value 1007, then the distance is outside the allowable access range and access is not granted to client 1002. If the difference between the send time and the receive time is less than or equal to the TTL value, then the distance is within an allowable access range and a wireless access point 1000 broadcasts location-based services to client 1002.

Figure 11:
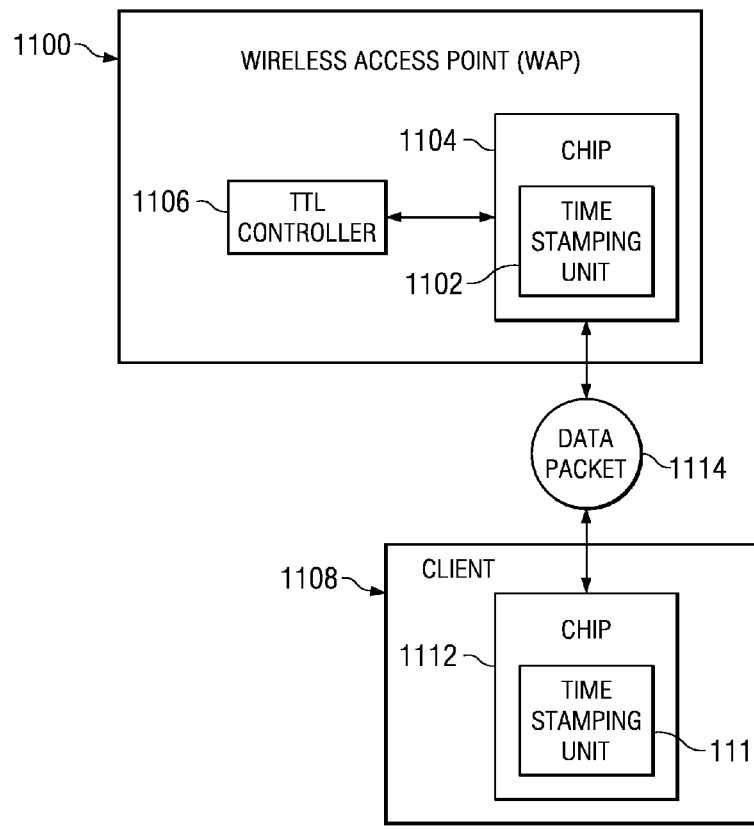
FIG. 11 is a time stamping unit for nanosecond precision timing in accordance with an illustrative embodiment.

Turning now to FIG. 11, a time stamping unit for nanosecond precision timing is shown in accordance with an illustrative embodiment. Wireless access point 1100 is a wireless access point, such as wireless access point 1000 in FIG. 10. Wireless access point 1100 includes time stamping unit (TSU) 1102. Time stamping unit 1102 is a hardware component located on chip 1104 on an Ethernet card. Chip 1104 is a dedicated Ethernet chip on wireless access point 1100.

Time stamping unit 1102 is located between the Ethernet media access control (MAC) and the Ethernet PHY transceiver to sniff outbound and inbound data packets. When a data packet is identified, time stamping unit 1102 latches the time in hardware. This provides the ability to precisely measure the arrival or departure time of data packets. Time stamping unit 1102 provides precise transmit and receive times for data packets to TTL controller 1106. TTL controller 1106 is a software component for controlling wireless access range, such as TTL controller 1009 in FIG. 10.

Time stamping unit 1102 utilizes precise time protocol (PTP) to deliver nanosecond-level precise time accuracy over a standard network connection. In this illustrative example, time stamping unit 1102 uses IEEE-1588 PTP. IEEE-1588 PTP is a hardware-assisted time stamping that provides a technique for exchanging precision time stamps between wireless access point 1100 and client 1108.

Client 1108 is a client-computing device, such as client 1002 in FIG. 10. Client 1108 also includes time stamping unit 1110 on chip 1112. Time stamping unit 1110 is a hardware time stamping unit, such as time stamping unit 1102.

Thus, in accordance with this illustrative example, wireless access point 1100 sends data packet 1114 to client 1108. Data packet 1114 includes a nanosecond-level precise send time indicating the precise time when wireless access point 1100 transmitted data packet 1114. Client 1108 receives data packet 1114. Time stamping unit 1110 records a nanosecond-level precise receive time indicating the precise time when client 1108 received data packet 1114. Data packet 1114 includes a time-to-live value. If the difference between the receive time and the send time is not less than or equal to the time-to-live value, data packet 1114 is discarded by client 1108. Thus, client 1108 does not receive access to the network. However, if the difference between the send time and the receive time is less than the time-to-live, then client 1108 is within an allowed access range. In this case, data packet 1114 is not discarded and client 1108 is able to connect and obtain access to the network.

In another embodiment, a wireless adapter may not have a high-resolution timer or time stamping unit to measure radio wave distance to an access point. In this situation, the wireless access point does not broadcast location-based services to a client without a high-resolution timer or a time stamping unit. However, the wireless access point may still allow the client to access the network by logging in and authenticating the user. A user can be authenticated by a user name and password, or any other means for authenticating a client and/or user.

The accuracy of measuring wireless transmission allows for the creation of a compact location-based services capable wireless access point. Illustrative embodiments provide a wireless access point that is capable of determining an exact location of a client device and providing location-based services to the client device based on the determined location.

Figure 12:
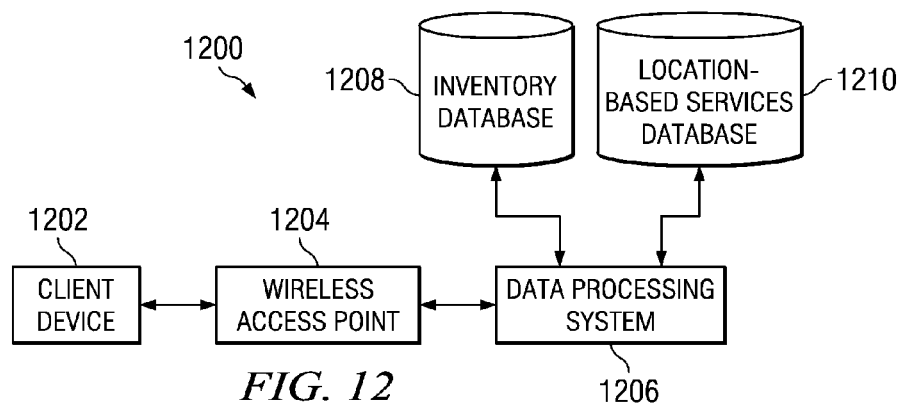
FIG. 12 is a block diagram of a system for managing location-based services provided via a wireless access point in accordance with an illustrative embodiment.

FIG. 12 is a block diagram of a system for managing location-based services provided via a wireless access point in accordance with an illustrative embodiment. System 1200 comprises client device 1202, wireless access point 1204, data processing system 1206, inventory database 1208 and location-based services database 1210.

Client device 1202 is any known or available client-computing device, including but not limited to, a desktop computer, a laptop computer, a PDA, a notebook computer, a cell phone, a smart watch, and/or any other device to enable a user to access a network. Client device 1202 may be implemented using any type of computing device, such as a personal computer, laptop, PDA, or any other computing device depicted in FIGS. 1-8.

Wireless access point may be implemented as a wireless access point such as wireless access point 1000 in FIG. 10. Data processing system may be implemented as a data processing system, such as data processing system 200 in FIG. 2.

Client device 1202 accesses a network such as network 102 in FIG. 1, through wireless access point 1204. Wireless access point 1204 determines the exact location of client device 1202 within the premises of business or the range of wireless access point 1204. Wireless access point 1204 communicates the location of client device 1202 to data processing system 1206. Data processing system 1206 refers to inventory database 1208 and uses the conveyed location of client device 1202 to determine what inventory or product client device 1202 is near. Data processing system 1206 then refers to location-based services database 1210 to determine what location-based services are available for the products or inventory that client device 1202 is near. In an alternate embodiment, inventory database 1208 and location-based services database 1210 are stored in wireless access point 1204. Thus, wireless access point 1204 determines what products client device 1202 is near and what location-based services to provide to client device 1202.

In an alternate embodiment, client device 1202 detects nearby objects. For example, objects could broadcast a radio frequency identification (RFID) that client device 1202 could receive. Client device 1202 transmits the received object information to wireless access point 1204. Wireless access point 1204 determines the location of the item based on the location of the client device and the receiving distance of the client device. Wireless access point 1204 looks up the received item identifications in inventory database 1208 and updates inventory database 1208 regarding the item and the location determined for the item. Wireless access point 1204 returns location-based service information to the client device about the items.

Inventory database 1208 is updated automatically and continuously regarding item counts and item location, as clients browse the store. Inventory database 1208 is updated as to the location of scanned items so that if an item was no longer found in an area, a location attribute for that item in inventory database 1208 could be updated reflecting this. Inventory database 1208 is used in the normal way by client devices 1202 that do not have the ability to detect nearby objects.

For example, according to inventory database 1208, client device 1202 expects to detect product A at a certain location. Normally, the system would send location-based service information to client device 1202 based on product A. However, when client device 1202 arrives at the location, client device 1202 scans product B. Thus, inventory database 1208 gets updated as having product B at the location, product A is updated as not being at the location, and location-based service information is sent to client device 1202 based on product B.

In one exemplary embodiment, a particular business could add the item detection hardware and software to 1 in every 5 shopping carts to enable this benefit. The item detection range, or scan power, for the client device can be customized for a given application, such as, for example, food shelves that are 3 feet deep. In an alternate embodiment, shielding is used to prevent signals from being received by client devices in an aisle other than where the item is located.

In another embodiment, wireless access point 1204 determines the direction and rate of movement of client device 1202. Data processing system 1206 uses the movement data to determine what location-based services to provide to client device 1202, so that the location-based services are provided to client device 1202 before the user physically moves past the inventory or products that are the subject of the location-based services.

In one embodiment, a system for managing location-based services provided via a wireless access point comprises a system with two wireless access points, the wireless access points being at least one foot apart. In another embodiment, the system includes more than two wireless access points, all of which are at least one foot apart from each other. In another illustrative embodiment, the system comprises a single wireless access point.

In one embodiment, the wireless access point contains two complete solutions, one solution for the left radio receiver/transmitter and one solution for the right radio receiver/transmitter. In an alternate embodiment, the wireless access point contains one solution that could effectively switch between the left and right receiver/transmitter. For example, at one instant the left receiver/transmitter is either powered off, disconnected, or both, while the right receiver/transmitter is active. The next instant, the right receiver/transmitter is either powered off, disconnected, or both, while the left receiver/transmitter is active. Alternatively, the wireless access point could switch between a first receiving antenna and a second antenna.

Figure 13:
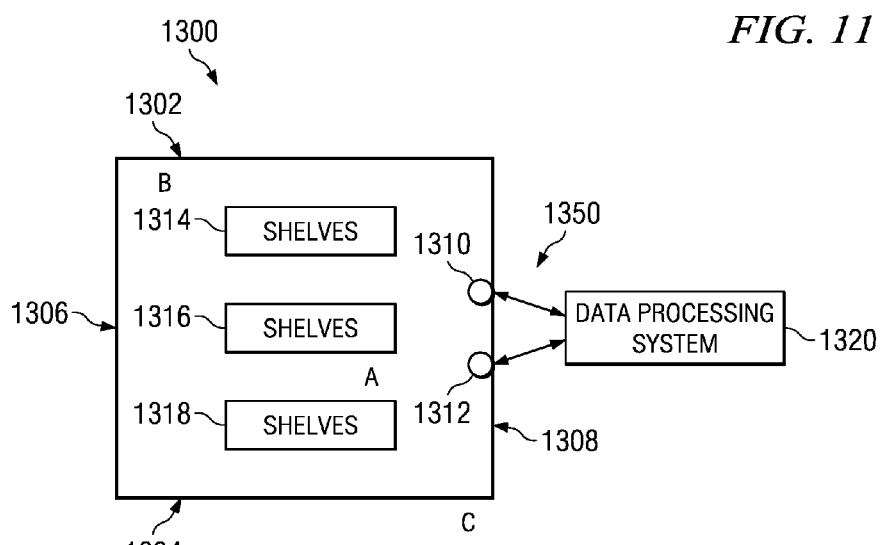
FIG. 13 is a block diagram of a system utilizing a wireless access point to manage location-based services in accordance with an illustrative embodiment.

FIG. 13 is a block diagram of a system utilizing a wireless access point to manage location-based services in accordance with an illustrative embodiment. System 1300 comprises building 1350, clients A, B, C, wireless access points 1310 and 1312 and data processing system 1320. Building 1350 comprises walls, 1302, 1304, 1306, 1308, and shelves 1314, 1316, and 1318. Data processing system 1320 may be implemented as a data processing system such as data processing system 200 in FIG. 2. Wireless access points 1310 and 1312 may be implemented as a wireless access point such as wireless access point 1000 in FIG. 10.

Clients A, B, and C each have a client device capable of communicating with wireless access points 1310 and 1312, and such device may be implemented as any type of computing device, such as a personal computer, laptop, PDA, or any other computing device depicted in FIGS. 1-8.

Data processing system 1320 stores information regarding the layout of building 1350, the inventory of building 1350 and location-based services that may be provided to a client based on the location of the client within building 1350. The layout of building 1350 includes information regarding the exact distance of various points along walls 1302, 1304, 1306, and 1308 from both wireless access points 1310 and 1312. The data from these points may be collected by storing calibration information from a calibration unit, such as calibration unit 1010 of FIG. 10, of wireless access points 1310 and 1312. Thus, a farthest distance from each wireless access point 1310 and 1312 that lies within building 1350 can be calculated. This distance can be used to determine the time-to-live setting, such as TTL value 1007 in FIG. 10.

In an alternate embodiment, the TTL setting is adjusted dynamically, based on the determined location for the client device. That is, once an exact location is determined, the TTL setting for that client device is adjusted so that location-based service information arrives at the client device just before the TTL expires. For example, a client is at home doing financial bank transactions. As a security measure, the client has configured the bank software to only allow logons and transactions from within the walls of his home. Rather than broadcasting the transaction information with a TTL setting equal to a maximum range, the TTL for the transaction information sent by the bank from a wireless access point to the client is adjusted to coincide with the precise location of the client. Thus, the transaction information is valid up to the location of the client, but is disabled at any distance beyond the location of the client.

As can be seen in FIG. 13, using a TTL setting that allows for client B to access wireless access points 1310 and 1312, also allows client C to access wireless access points 1310 and 1312. However, as client C is outside or beyond the premises of building 1350, the business located in building 1350 may desire to limit access to wireless access points 1310 and 1312 to only those clients that are actually on the premises. One solution to this problem is to have walls 1302, 1304, 1306, and 1308 comprised of a material that blocks transmission of the signal from wireless access points 1310 and 1312. Thus, no one outside of building 1350 can access the network through wireless access points 1310 and 1312.

Another solution is to have a layout of building 1350 stored in memory of data processing system 1320 that is connected to wireless access points 1310 and 1312. Thus, when a signal is received from a client, the distance traveled by the signal to wireless access points 1310 and 1312 will be different, as wireless access points 1310 and 1312 are spaced at least one foot apart. The two different distances traveled and the known distance between wireless access points 1310 and 1312 can be used to determine an exact location of the point of origin of the signal. This location is compared to the layout of building 1350 stored in data processing system 1320. A determination can then be made as to whether the client broadcasting the signal is actually within the premises of building 1350. If data processing system 1320 determines that the client is within the premises of building 1350, data processing system uses the determined location of the client to lookup what products are located near the client and what location-based services are available that apply to the location of the client. Wall 1308, that wireless access points 1310 and 1312 are mounted on may be shielded, as appropriate, to prevent communication with clients behind the wall, outside of building 1350.

Furthermore, data processing system 1320 can also determine client movement, that is, the direction the client is moving and how fast the client is moving. Data processing system 1320 can use this information to alert the client about an item with enough time for the client to react and not overshoot or physically move pass the item. Additionally data processing system 1320 may contain information specific to the client, such as client product preferences, buying patterns, what is on sale, and so forth and factor this information into the determination of what location-based services to present to the client.

Figure 14:
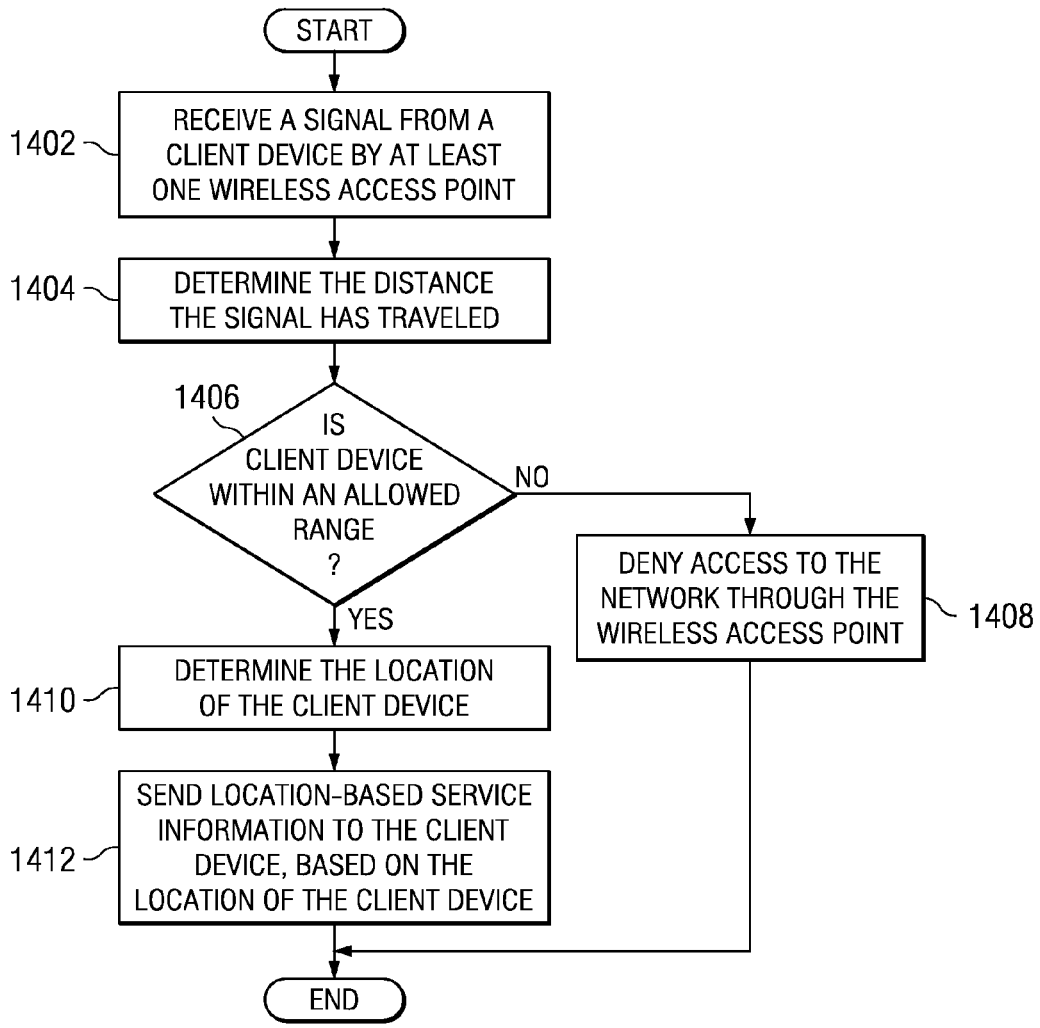
FIG. 14 is a flow chart illustrating the process of managing location-based services provided via a wireless access point in accordance with an illustrative embodiment.

FIG. 14 is a flow chart illustrating the process of managing location-based services provided via a wireless access point in accordance with an illustrative embodiment. The operation of FIG. 14 may be implemented in a wireless access point, such as wireless access point 1000 in FIG. 10.

The operation begins when a signal from a client device is received by at least one wireless access point (step 1402). This signal should be received by at least two separate receiving elements spaced at least one foot apart, which are connected to one or more receivers. The receivers may be part of the same wireless access point or the receivers may each belong to a separate wireless access point. The distance the signal has traveled is determined (step 1404). The distance the signal has traveled is calculated by determining the duration of the time the signal took to travel from the client device to the receiver(s) of the wireless access point(s). The duration is determined be comparing a time when the signal was sent to a time when the signal received. The difference in times is the duration. As a wireless transmission travels at the rate of one foot per nanosecond, the calculated duration is converted easily into a distance.

A determination is made as to whether the client device is within an allowed range (step 1406). The determination as to whether the client device is within an allowed range is made by comparing the determined duration of the signal to a preset limit on the duration of a signal for communication called a time-to-live setting. If the client device is not within an allowed range (a no output to step 1408), access to the network through the wireless access point is denied (step 1408) and the process ends.

If the client device is within an allowed range (a yes output to step 1406), the location of the client device is determined (step 1410). The location of the client can be determined using a variety of factors and data points, depending on the specific implementation. In an illustrative embodiment, the distance the signal has traveled from a client device to two different receivers, either each belonging to the same wireless access point or each belonging to separate wireless access points is used to determine the location of the client device. Location-based service information is then sent to the client device, based on the location of the client device (step 1412) and the operation ends.

Location-based service information based on the location of the client device may be determined in a variety of ways. In an illustrative embodiment, the location of a client device is compared to a layout of a store or business. This location information is cross-referenced with stock information and location-based service information in order to determine what location-based service information to provide to the client device. Further, in an alternate embodiment, a direction and rate of movement of a client device is calculated. Location-based service information is then determined based on the direction and rate movement of the client device.

In an exemplary embodiment, the wireless access point stores the premises layout information, inventory information, location-based services information and performs all calculations regarding determining a distance traveled, location of a client device, rate of movement of the client device, and so forth. However, alternate embodiments contemplate some or all of these functions being handled by a data processing system that is remote to the wireless access point.

In one alternate embodiment, the wireless access point receives signals from a client device and calculates a distance traveled and a rate of movement of the client device, while a remote data processing system contains premises layout information, inventory information, and location-based services information. The wireless access point sends the determined location of the client device, rate of movement, and direction of movement information to the data processing system, which then determines location-based service information to send to the client device, based on the received information.

In another alternative embodiment, the wireless access point merely receives a signal from a client device. The wireless access point transmits an acknowledgement of the receipt of the signal plus a timestamp regarding when the signal was received to a remote data processing system. The remote data processing system determines the location, rate and direction of movement of the client device, nearby inventory, and what location-based services information to send to the client device.

The illustrative embodiments recognize that an owner of a wireless access point may desire to provide location-based services to some selected areas of the owner's property and not to other areas of the owner's property and/or adjacent properties using current wireless access points and Internet service providers.

The illustrative embodiments also recognize that current wireless access points and Internet service providers do not provide a means for readily limiting or adjusting location-based services to a specific location of a customer. Therefore, the illustrative embodiments provide a computer-implemented method, apparatus, and computer-usable program code for managing location-based services provided by wireless access points.

Exemplary embodiments utilize precision time stamping to provide geographically dispersed location-based services from a single source. Exemplary embodiments provide a compact, integrated solution for providing location-based services that provide several advantages over current solutions in terms of ease of deployment, maintenance, cost, and return on investment.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method for managing location-based services provided via a wireless access point, the computer-implemented method comprising:
   receiving a signal from a client device by at least one wireless access point;
   determining a distance the signal has traveled to the at least one wireless access point;
   determining whether the client device is within an allowed range of the at least one wireless access point, based on the determined distance;
   responsive to a determination that the client device is within an allowed range, determining a location of the client device; and
   sending location-based service information to the client device based on the determined location of the client device.

2. The computer-implemented method of claim 1, wherein the signal from the client device is received by a plurality of receiving elements coupled to one or more receivers of the at least one wireless access point;
   wherein determining the location of the client device based on the determined distance comprises:
   determining a distance the signal has traveled to each receiving element of the plurality of receiving elements; and
   comparing the distance traveled by the signal to each of the receiving elements to determine the location of the client device.

3. The computer-implemented method of claim 2, wherein each of the one or more receivers is part of a single wireless access point.

4. The computer-implemented method of claim 2, wherein each of the one or more receivers is associated with a separate wireless access point.

5. The computer-implemented method of claim 2, wherein the plurality of receiving elements comprises two receiving elements and wherein the two receiving elements are at least one foot apart from each other.

6. The computer-implemented method of claim 1, wherein determining whether the client device is within an allowed range of the at least one wireless access point, based on the determined distance comprises:
   comparing the distance signal traveled to a time-to-live setting.

7. The computer-implemented method of claim 1, wherein sending location-based service information to the client device based on the determined location of the client device comprises:
   determining at least one product within a predetermined distance from the determined location of the client device;
   determining location-based service information associated with the determined at least one product; and
   sending the determined location-based service information to the client device.

8. The computer-implemented method of claim 1, further comprising:
   determining a direction of movement for the client device; and
   determining a rate of movement for the client device.

9. The computer-implemented method of claim 8, wherein sending location-based service information to the client device based on the determined location of the client device comprises:
   predicting a location of the client device;
   determining at least one product within a predetermined range of the predicted location of the client;
   determining a time the client device will arrive at the predicted location;
   determining location-based service information associated with the determined at least one product; and
   sending the determined location-based service information to the client device at the determined time.

10. The computer-implemented method of claim 9, wherein predicting a location of the client device comprises;
    determining a location of the client device based on a layout, the rate movement of the client device, and the direction of movement of the client device.

11. The computer-implemented method of claim 1, further comprising:
    determining if the determined location of the client device is within a premises of a business.

12. The computer-implemented method of claim 1, further comprising:
    receiving a signal from an item of inventory by a client device;
    determining a location of the item of inventory based on the determined location of the client device; and
    updating an entry comprising the determined location for the item of inventory.

13. The computer-implemented method of claim 1, further comprising:
    adjusting a time-to-live setting for the client device based on the determined distance.

14. A computer program product embodied in a non-transitory computer readable storage medium
    for managing location-based services provided via a wireless access point, the computer program product comprising the programming instructions for:
    receiving a signal from a client device by at least one wireless access point;
    determining a distance the signal has traveled to the at least one wireless access point;
    determining whether the client device is within an allowed range of the at least one wireless access point, based on the determined distance;
    responsive to a determination that the client device is within an allowed range, determining a location of the client device; and
    sending location-based service information to the client device based on the determined location of the client device.

15. The computer program product of claim 14, wherein the signal from the client device is received by a plurality of receiving elements coupled to one or more receivers of the at least one wireless access point;
    wherein the programming instructions for determining the location of the client device based on the determined distance comprises the programming instructions for:

determining a distance the signal has traveled to each receiving element of the plurality of receiving elements; and comparing the distance traveled by the signal to each of the receiving elements to determine the location of the client device.

16. The computer program product of claim 14, wherein the programming instructions for sending location-based service information to the client device based on the determined location of the client device comprises the programming instructions for:

determining at least one product within a predetermined distance from the determined location of the client device;

determining location-based service information associated with the determined at least one product; and sending the determined location-based service information to the client device.

17. The computer program product of claim 14, further comprising the programming instructions for:

determining a direction of movement for the client device; and determining a rate of movement for the client device.

18. The computer program product of claim 17, wherein the programming instructions for sending location-based service information to the client device based on the determined location of the client device comprises the programming instructions for:

predicting a location of the client device;

determining at least one product within a predetermined range of the predicted location of the client;

determining a time the client device will arrive at the predicted location;

determining location-based service information associated with the determined at least one product; and sending the determined location-based service information to the client device at the determined time.

19. The computer program product of claim 14, further comprising the programming instructions for:

adjusting a time-to-live setting for the client device based on the determined distance.

20. A system for managing location-based services comprising:

a plurality of receiving elements coupled to one or more receivers, wherein the plurality of receiving elements receive a signal from a client device;

a time stamping unit, wherein the time stamping unit measures a transmit time when the signal is transmitted and a receive time when the signal is received;

a calibration unit, wherein the calibration unit identifies a time-to-live value for defining an allowed access range of the wireless access point;

a controller, wherein the controller determines a distance from a client device to the wireless access point based on the receive time and the transmit time;

a memory comprising computer usable program code; and a processor coupled to the memory, wherein the processor executes the computer usable program code to determine whether the client device is within the allowed range based on the determined distance; responsive to a determination that the client device is within the allowed range, determine a location of the client device; and send location-based service information to the client device based on the determined location of the client device.

* * * * *